Patented Sept. 4, 1928.

1,683,401

UNITED STATES PATENT OFFICE.

IWAN OSTROMISLENSKY AND MORRIS G. SHEPARD, OF NEW YORK, N. Y., ASSIGNORS TO THE NAUGATUCK CHEMICAL COMPANY, OF NAUGATUCK, CONNECTICUT, A CORPORATION OF CONNECTICUT.

PROCESS FOR MAKING SUBSTANTIALLY HOMOGENEOUS MASSES OF POLYMERIZED STYROL FROM A NONHOMOGENEOUS MASS OF POLYMERIZED STYROL.

No Drawing. Application filed May 7, 1924. Serial No. 711,588.

This invention relates to processes for making substantially homogeneous masses of polymerized styrol from a non-homogeneous mass of polymerized styrol.

The principal object of the invention is to provide a simple, efficient process of the kind described which may be used in conjunction with freshly made polymerized styrol or scrap of various sorts.

The invention accordingly comprises a process for making a homogeneous mass of polymerized styrol or its homologues which includes combining unpolymerized Ar.CH: $CH_2$ with a non-homogeneous mass of polymerized Ar.CH: $CH_2$, and polymerizing the unpolymerized Ar.CH: $CH_2$.

The expression "non-homogeneous mass" as used herein is intended to include a mass consisting of separate pieces of polymerized styrol or a single non-homogeneous mass, for example a mass containing bubbles.

The terms "tough transparent polymerized Ar.CH: $CH_2$," and "tough transparent polymerized styrol" as used herein are intended to include that polymerized Ar.CH: $CH_2$ and that polymerized styrol which are tough and transparent and which may be practically colorless. They also show a dull fracture and may be cut with a knife to form thin films or parings. The terms exclude the brittle easily pulverized products which show a bright sharply defined fracture, which have a generally brownish color and a lower melting point than the vitreous type, and which when cut with a knife chip or crumble. The materials are those referred to in the copending application of Ostromislensky, Serial No. 711,584 filed May 7, 1924.

In the formulæ just given Ar represents an aryl group.

In carrying out the invention in its preferred form, 5 parts of unpolymerized liquid styrol are added to 95 parts of non-homogeneous tough transparent polymerized styrol, whereupon the mixture is heated at 180° C. for 3 hrs. preferably in a vessel provided with a reflux condenser open to the atmosphere, though a closed vessel may be employed if desired. At the end of this time a substantially homogeneous mass of polymerized styrol results. During the course of this process the small amount of liquid unpolymerized styrol added is polymerized. During the process practically no boiling of the styrol occurs because it is absorbed rapidly by the polymerized styrol. The resultant product is a substantially homogeneous tough transparent polymerized styrol. It will have the general shape of the polymerizing vessel, and being free from bubbles is ready to be fashioned on a lathe, or otherwise machined, or to be extruded, or treated as desired to produce an article free from bubbles and like defects.

The tough transparent polymerized styrol employed in the above example may be the broken up mass obtained by the Ostromislensky-Gibbons process set forth in copending application Serial No. 711, 585 filed May 7, 1924, or other non-homogeneous mass such as one containing bubbles. Again it may consist of pieces of tough transparent polymerized styrol such as scrap from molding and cutting operations. In the course of our experiments it has been found that such non-homogeneous mass of polymerized styrol may be fused together to a certain extent but in every case a certain amount of air will remain trapped in the fused mass in the form of bubbles. The fused styrol in other words is not sufficiently liquid to permit these bubbles to rise to the top of the mass and escape heating. Such escape is, however, permitted by the process outlined above.

We have found in accordance with our experiments that the amount of unpolymerized material which may be added to the non-homogeneous polymerized material may be varied. An example of such variation is as follows: 80 parts of non-homogeneous tough transparent polymerized styrol is mixed with 20 parts of unpolymerized styrol and heated for 5 hrs. at 180° C. in a vessel with a reflux condenser at atmospheric pressure, at the end of which time a homogeneous tough transparent polymerized styrol is obtained.

Instead of carrying out the process at atmospheric pressure broken pieces of tough transparent polymerized styrol or other form of non-homogeneous tough transparent polymerized styrol are placed in a mold preferably the Plunger type and pressed with simultaneous heating. The time and temperature of pressing will depend upon the shape and size of the mold. For a small object, say 1 cu. in., 5 to 10 minutes at 160° C. at 1000 lbs. per sq. in. pressure is used. The mold is then cooled and a homogeneous tough transparent polymerized styrol is obtained. Instead of heating for 5 to 10 minutes while the substance is under compression, the mold containing the mixture of styrol and tough transparent polymerized styrol may be heated to 160° C. for 10 minutes without subjecting to pressure. Thereafter if the mold with its heated contents is placed in the press and subjected to 1000 lbs. pressure for 2 minutes a substantially homogeneous mass of tough transparent polymerized styrol is secured.

Another method consists in placing pieces of non-homogeneous tough transparent polymerized styrol or pieces of tough transparent polymerized styrol containing bubbles formed in any way resulting from admixture of gas in an autoclave and heating to 170° C. for 20 minutes under air pressure of approximately 20 atmospheres. Not only is the resultant polymerized styrol a homogeneous tough transparent polymerized styrol but it is a harder material than tough transparent polymerized styrol prepared at atmospheric pressure.

As another example of the invention a mixture of shavings from tough transparent polymerized styrol or powdered tough transparent polymerized styrol and various odds and ends left over from the machining of this material which may contain various admixtures such as coloring materials, zinc oxide, etc. is dissolved in substantially pure styrol, the amount of the solvent being varied from 15 to 60% based on the weight of the tough transparent polymerized styrol taken. From the resulting solutions such admixtures as are insoluble in styrol, zinc oxide, insoluble colors, etc. are filtered off, whereupon the solution may then be polymerized by subjecting it to 180° C. for 8 hrs. following the procedure given in the preferred example above. All of the above mixtures of styrol and non-homogeneous polymerized styrols when polymerized under the conditions set forth are substantially free from unpolymerized styrol.

Instead of tough transparent polymerized styrol various other forms of non-homogeneous substances falling under the general formula Ar.CH : CH$_2$ may be employed, not only in combination with styrol itself but in combination with each other. Such substances are as follows: Orthomethyl styrol, meta-metadimethyl styrol, paramethyl styrol.

The amount of the unpolymerized material which may be employed varies, but is preferably, when used in substantially pure form, not less than 5% of the weight of the non-homogeneous polymerized material. The time will vary from 3 to 8 hrs. and the temperature will vary from 130° to 200° C.

As many apparently widely different embodiments of this invention may be made without departing from the spirit thereof, it will be understood that we do not intend to limit ourselves to the specific embodiment herein set forth except as indicated in the appended claims.

Having thus described our invention what we claim and desire to protect by Letters Patent is:—

1. A process for making a homogenous mass of tough transparent polymerized Ar. CH : CH$_2$ where Ar represents an aryl nucleus which comprises combining unpolymerized Ar.CH : CH$_2$ with a non-homogeneous tough transparent polymerized Ar.CH : CH$_2$, and polymerizing said unpolymerized Ar.CH : CH$_2$ to the tough transparent modification substantially free from unpolymerized Ar.CH : CH$_2$.

2. A process for making a homogenous mass of tough transparent polymerized Ar. CH : CH$_2$ where Ar represents an aryl nucleus which comprises combining unpolymerized Ar.CH : CH$_2$ with a non-homogeneous tough transparent polymerized Ar.CH : CH$_2$, and heating the combination to form a homogeneous mass of tough transparent polymerized Ar.CH : CH$_2$, substantially free from unpolymerized Ar.CH : CH$_2$.

3. A process for making a homogeneous mass of tough transparent polymerized Ar. CH : CH$_2$, where Ar represents an aryl nucleus which comprises combining unpolymerized Ar.CH : CH$_2$ with a non-homogeneous tough transparent polymerized Ar.CH : CH$_2$, and heating the combination for 3 to 8 hrs. at 200° to 130° C. until the product is completely polymerized.

4. A process for making a homogeneous mass of tough transparent polymerized styrol which comprises combining unpolymerized styrol with a non-homogeneous tough transparent polymerized styrol, and polymerizing the unpolymerized styrol to form tough transparent polymerized styrol substantially free from unpolymerized styrol.

5. A process for making a homogeneous mass of tough transparent polymerized styrol which comprises combining unpolymerized styrol with non-homogeneous tough transparent polymerized styrol, and heating the combination to form a homogeneous mass of tough transparent polymerized styrol substantially free from unpolymerized styrol.

6. A process for making a homogeneous mass of tough transparent polymerized styrol which comprises dissolving in unpolymerzied styrol a non-homogeneous tough polymerized styrol containing insoluble materials, filtering to remove the impurities and heating the combination to form a homogeneous mass of tough polymerized styrol containing substantially no unpolymerized styrol.

7. A step in the process of forming a mass of homogeneous Ar.CH:CH$_2$ where Ar represents an aryl nucleus which consists in allowing unpolymerized Ar.CH:CH$_2$ and tough polymerized Ar.CH:CH$_2$ to remain together at 200°–130° C. until complete polymerization of the unpolymerized material occurs to form tough polymerized Ar.CH:CH$_2$.

8. A step in the process of forming a mass of homogeneous polymerized Ar.CH:CH$_2$, where Ar represents an aryl nucleus, which consists in allowing unpolymerized Ar.CH:CH$_2$ and tough polymerized Ar.CH:CH$_2$ to remain together at 200°–130° C. under pressure until complete polymerization of the unpolymerized Ar.CH:CH$_2$ takes place to form tough polymerized Ar.CH:CH$_2$.

9. A step in the process of forming a homogeneous tough polymerized styrol which consists in allowing unpolymerized styrol and tough polymerized styrol to remain together at 200°–130° C. until complete polymerization of the styrol occurs to form tough polymerized styrol.

10. A step in the process of forming a homogeneous tough polymerized styrol which consists in allowing unpolymerized styrol and tough polymerized styrol to remain together at 200°–130° under pressure until complete polymerization of the unpolymerized styrol to tough polymerized styrol occurs.

11. The steps in the process of forming a homogeneous tough polymerized styrol, the steps which consist in adding 5 parts of liquid styrol to 95 parts of non-homogeneous tough polymerized styrol, and heating to 180° C. for 3 hrs. to polymerize completely the liquid styrol to form a homogeneous mass of tough polymerized styrol.

Signed at New York, New York, this 30 day of April, 1924.

IWAN OSTROMISLENSKY.

Signed at New York, New York, this 30 day of April, 1924.

MORRIS G. SHEPARD.